UNITED STATES PATENT OFFICE.

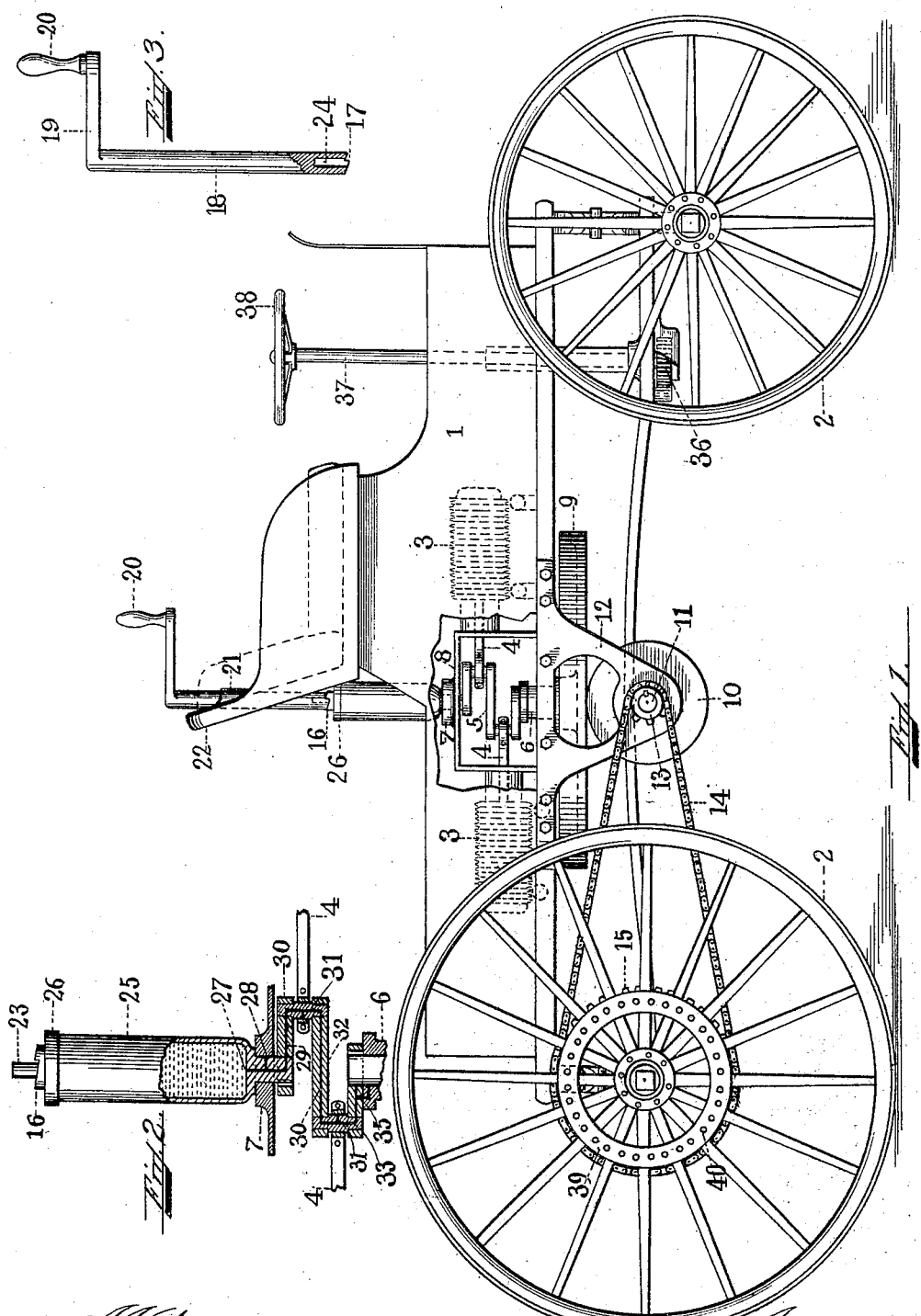

CHARLES B. HATFIELD, OF ROCHESTER, NEW YORK, ASSIGNOR TO HATFIELD MOTOR VEHICLE COMPANY, OF CORTLAND, NEW YORK, A CORPORATION OF NEW YORK.

AUTOMOBILE.

No. 859,293.      Specification of Letters Patent.      Patented July 9, 1907.

Application filed March 26, 1906. Serial No. 308,044.

*To all whom it may concern:*

Be it known that I, CHARLES B. HATFIELD, a citizen of the United States, residing at Rochester, in the county of Monroe and State of New York, have invented certain new and useful Improvements in Automobiles; and I do hereby declare the following to be a full, clear, and exact description of the invention, such as will enable others skilled in the art to which it appertains to make and use the same.

The present invention relates to automobiles or self-propelled road vehicles and it has for its object to provide means whereby the engine may be "cranked" so-called, or started from the seat of the vehicle; to provide an improved form of friction driving mechanism so arranged as to, by its inertia, counteract the tendency of vibration and thus promote the smooth running of the vehicle; and to provide an improved oiling arrangement for the crank shaft of the engine, all as will be hereinafter described and pointed out in the claims.

To the above ends the present invention consists of the devices and combinations of devices which will be hereinafter described and claimed.

The present invention is shown in the accompanying drawings, in which:—

Figure 1 shows in side elevation an automobile of the "runabout" type embodying the same, parts of the body of the vehicle being broken away to show the interior construction. Fig. 2 shows in part elevation and part vertical section my improved crank shaft and oiling device. Fig. 3 shows the cranking device removed.

Similar reference characters will be employed throughout the specification and drawings to designate corresponding parts.

In the drawing 1 represents the body of the vehicle, mounted upon the wheels 2. In the body of the vehicle 1 is disposed a suitable engine 3, which engine may be of any usual or preferred type, that shown being the well known type of two cylinder explosive engine. The piston rods 4 of the engine are connected to the double crank shaft 5, which crank shaft is mounted in the bearing 6 fixed to the floor of the vehicle, and the bearing 7 of a metallic frame 8. At its lower end the crank shaft 6 carries a friction driving disk 9, which is rotated by the crank shaft and which drives by frictional contact a friction driven wheel 10, the driven wheel 10 being splined to a shaft 11 mounted transversely of the vehicle in suitable brackets 12, fastened to the sides of the vehicle and extending downward therefrom, it being understood that there are two of these brackets 12, one on each side of the vehicle.

The shaft 10 carries upon its opposite ends sprocket wheels 13, which are connected by chains 14 to large sprocket wheels 15, secured to the rear driving wheels 2. Only one of the driving connections is shown in the drawing, but it will be understood by those skilled in this art that the driving connection shown and described will be duplicated at the opposite side of the vehicle and connected in like manner to the opposite driving wheel.

From the foregoing description it will be apparent that the engine will rotate the crank shaft 5 and thus impart a rotary movement to the driving disk 9 which will in turn rotate the driven wheel 10, and thus rotate the shaft 11 and its connected sprocket wheels 13, which in turn will through the chains 14 and large sprocket wheels 15 rotate the driving wheels 2 of the vehicle and propel the vehicle backward or forward, according as may be desired. In this connection it will be understood that the driven wheel 10 will have the usual means for imparting to it a longitudinal movement along its shaft 11, so as to change its point of contact with the friction face of the driving disk 9 either to move it to one side or the other of the axis of the driving disk 9, or to place it in contact with the axis, where will be located preferably a floating center, such as described in my co-pending application, filed March 26, 1906, Serial No. 308,045. Thus the direction of travel of the vehicle may be either forward or backward, according as the driven wheel 10 is to one side or the other of the axis of the driving disk 9, or the vehicle may be stopped by moving the driven wheel 10 to place it in contact with the floating center of the driving disk 9, without the necessity of stopping the engine.

It is deemed desirable to call attention at this point to the fact that the rotation in a horizontal plane of the comparatively heavy driving disk 9 will cause the driving disk to act somewhat in the nature of the well known gyroscope, and that this action will tend to overcome the shocks and vibrations of the body incident to the travel of the vehicle over uneven roads. I consider this arrangement to be an important feature of my invention.

For the purpose of starting the engine or to "crank" it, as it is termed, from the seat of the vehicle, the crank shaft 5 will carry at its upper end a clutch member 16 arranged to co-operate with a corresponding clutch member 17 at the lower end of the cranking rod 18, which at its upper end carries the usual crank arm 19 and handle 20. The crank rod 18 is arranged to be received in a bearing 21 permanently mounted at the back of the vehicle seat 22, in vertical alinement with the crank shaft 5, the arrangement being such that the crank rod 18 may be fitted in its bearing 21 and the clutch connections 16 and 17 fitted together, so that the engine may be started as before stated from the seat of the vehicle, without the necessity of the driver getting out of the vehicle, as is necessary with those vehicles where the cranking is done from the side or from the front. The upper end of the crank shaft 5 will be provided with a cylindrical pin 23, arranged to take in a bore 24 in the lower end of the crank rod 18.

For the purpose of lubricating the bearings of the crank shaft and the connections of the piston rods 4 with the cranks, the upper end of the crank shaft is preferably made in the form of a cylindrical oil receptacle 25, the upper end of which is closed by a cap 26 which carries the clutch member 16 and the cylindrical pin 23. This oil receptacle 25 will be filled with a lubricating oil which will be led therefrom through ports 27 and 28 for the purpose of lubricating the bearing 7, and thence by means of ports 29, 30 and 31, to lubricate the connection of one of the piston rods 4 with its crank, and thence by means of ports 32, 33 and 34, for the purpose of lubricating the other crank connection, and thence by means of a port 35, to lubricate the bearing 6, all as clearly shown in Fig. 2 of the drawing.

I consider this oiling arrangement to be an important feature of my invention.

It will of course be understood that the vehicle will be provided with some suitable form of steering mechanism, 36, for steering the forward wheels 2 and with a suitable connection such as a vertical shaft 37 and wheel 38, whereby the steering mechanism may be operated from the seat of the vehicle.

The large sprocket wheel 15 is made in the form of a ring and is held to the spokes of the rear wheels by means of a clamping ring 39, placed upon the outer side of the spokes and the sprocket wheel ring 15 and the clamping ring 39 will be securely held together and to the spokes of the wheel by means of bolts 40 passing through the two rings and preferably located in pairs between each pair of spokes, as clearly shown in Fig. 1 of the drawing.

Having described my invention I claim as new and desire to protect by Letters Patent of the United States:—

1. In self propelled vehicles, the combination with a suitable engine, of a vertically disposed crank shaft connected with the engine, a vertically disposed bearing in the vehicle in vertical alinement with the crank shaft, a movable cranking rod arranged to be received in and to turn in the bearing, and suitable clutch connections between the cranking rod and the crank shaft whereby the engine may be started from the body of the vehicle, substantially as described.

2. In self propelled vehicles, the combination with a suitable engine, of a vertically disposed crank shaft driven by the engine, said shaft carrying a vertically disposed oil receptacle, and suitable ports leading from the oil receptacle to the bearings for the crank shaft and the crank and piston rod connections, substantially as described.

In testimony whereof I affix my signature, in presence of two witnesses.

CHARLES B. HATFIELD.

Witnesses:
T. HART ANDERSON,
MAY A. KENNEY.